March 13, 1928.

C. F. YOUNG ET AL

DUMPING DEVICE

Filed April 2, 1924

INVENTORS
Charles F. Young
Edmond M. Ries
BY Clarence Pinder ATTORNEY.

March 13, 1928.
C. F. YOUNG ET AL
DUMPING DEVICE
Filed April 2, 1924
1,662,653
2 Sheets-Sheet 2
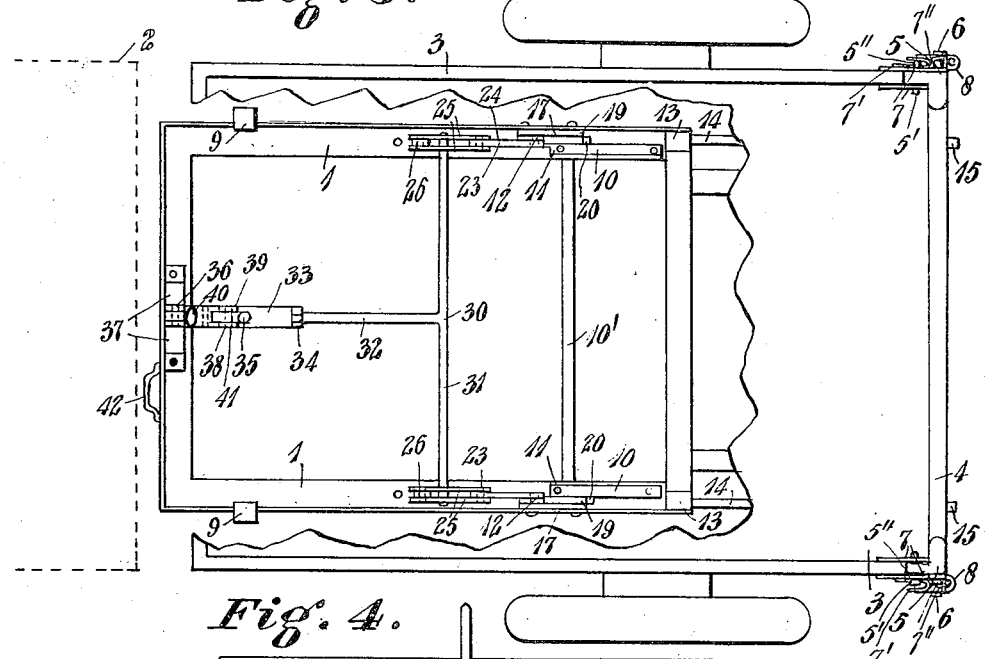
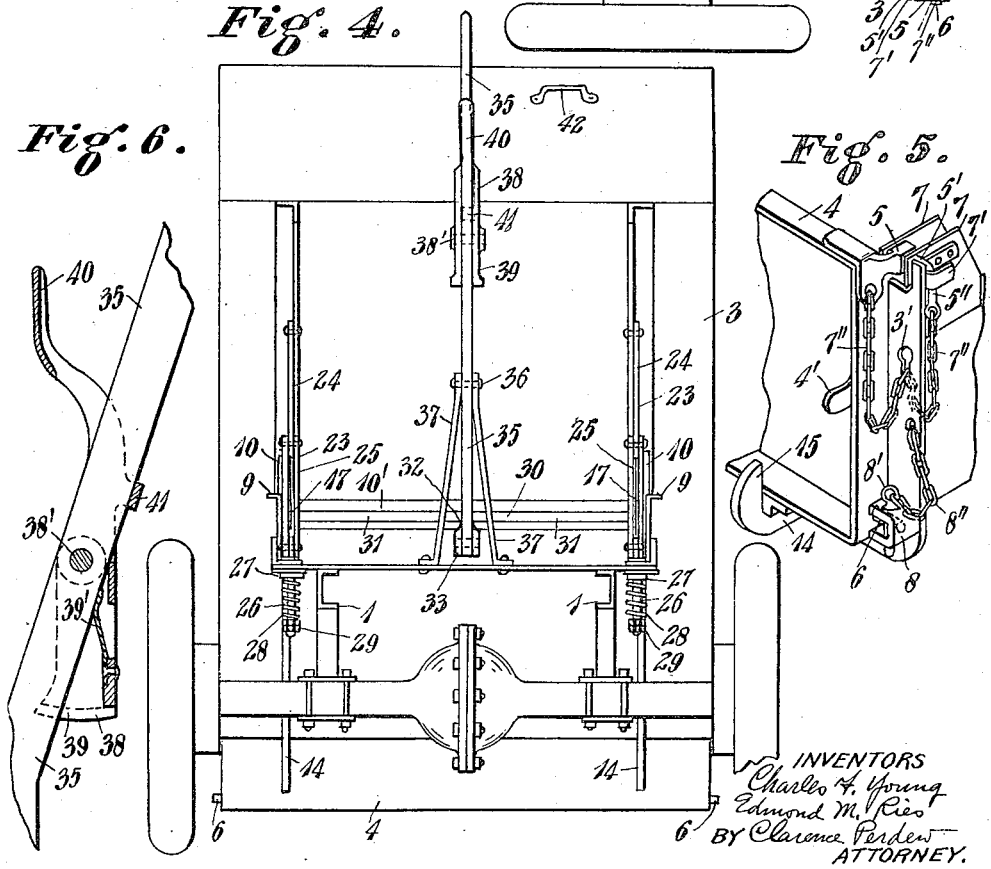
INVENTORS
Charles F. Young
Edmond M. Ries
BY Clarence Perdew
ATTORNEY.

Patented Mar. 13, 1928.

1,662,653

UNITED STATES PATENT OFFICE.

CHARLES F. YOUNG AND EDMOND M. RIES, OF COVINGTON, KENTUCKY, ASSIGNORS TO THE STEWART IRON WORKS COMPANY, OF COVINGTON, KENTUCKY, A CORPORATION OF KENTUCKY.

DUMPING DEVICE.

Application filed April 2, 1924. Serial No. 703,742.

Our invention relates to devices for discharging materials, and especially to unloading vehicles, such as wagons or motor trucks, and its object is to simplify and increase the ease and safety of operation of such devices, and especially to permit the driver of a vehicle to operate such a device thereon entirely from the driver's seat, without necessity of leaving the seat either for discharging the load or for returning the device to its loading and hauling position, as well as permit the driver to drive the vehicle with the device in discharging position. Other objects will appear in the course of the ensuing description.

We attain these objects by the device illustrated, for example, in the accompanying drawings, in which—

Fig. 3 is a partial plan view corresponding to Fig. 1, the bottom and front of the bed being broken away to reveal the underlying mechanism;

Fig. 4 is a partial front elevation corresponding to Fig. 2;

Fig. 5 is a detail perspective view of the end gate and its supporting and locking devices; and Fig. 6 is a similar view of the detent for holding the bed in hauling position.

Figure 1:
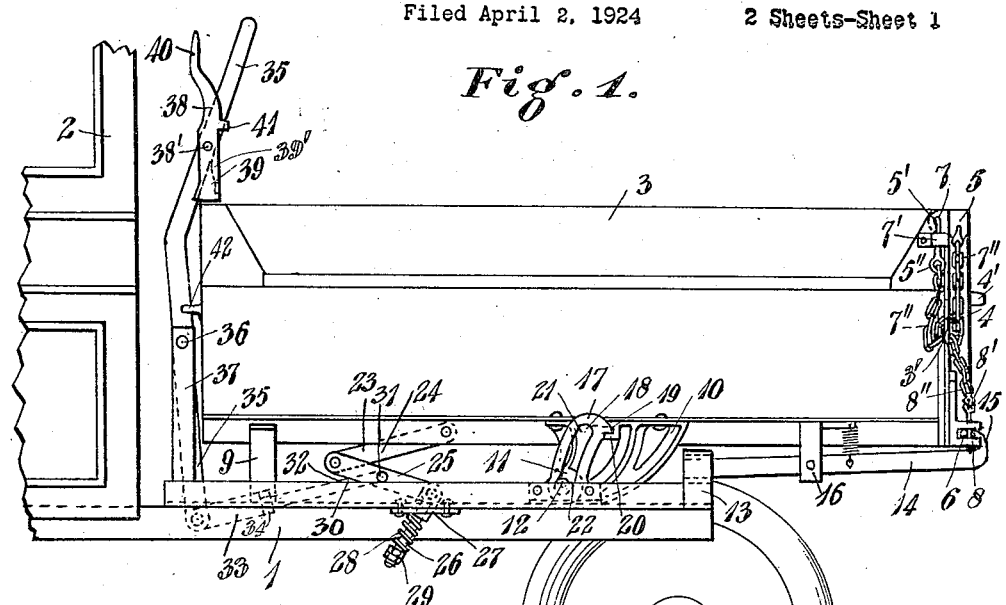
Figure 1 is a partial side elevation of a motor truck embodying our invention, in loading and hauling position.

The chassis frame 1 supports the driver's seat structure 2 at the front (Fig. 1) to the rear of which is the bed 3, which is of the usual elongated box-like formation, considerably wider than the chassis frame and extending some distance rearwardly of the rear wheels. Its rear end has the end-gate 4 which has at its upper corners the ears 5 and at its lower corners the pivots 6. The upper corners of the rear end of the bed have brackets 7 with openings with which the ears 5 register when the end-gate is closed; the ears 5 and these openings receiving pins 5′ having members 5″ bent at right angles to the pins. The brackets 7 straddle the ears 5, and on their outer members have clips 7′ extending across just below the openings, so that the pins 5′ may be inserted with their members 5″ swung up, and then these members may be swung down behind the clips 7′, locking the pins in place. Chains 7″ are connected to the ends of the pin members 5″, and lead through key-hole shaped slots 3′ in the rear end flanges of the bed 3 some distance down from their tops; the other ends of these chains being connected to the end-gate 4 near its upper corners, while some distance down from these corners the end-gate 4 has the spurs 4′ projecting rearwardly and laterally inwardly. The lower corners of the rear end of the bed 3 have the jaws 8 opening laterally inwardly, with vertically extending openings; these jaws receiving the pivots 6 of the end-gate when closed, and the openings receiving the pins 8′ which are secured to the bed 3 by short chains 8″.

The front end of the bed rests, in hauling position, on pedestals 9 at each side of the frame 1; and near the rear end of the frame the bed 3 has rockers 10 fixed to its bottom, each having a lower curved rocking edge extending from the junction with the bed 3 downwardly and forwardly to a front end 11 projected down from the bed and having a laterally outwardly projected guide lug 12. This rocking edge or surface bears on the top of the respective frame side, and when the bed is allowed to tilt it travels rearwardly on the frame by the rolling of this rocker 10 at each side; and also, the bed as a whole is lowered, as well as tilted, in the operation of unloading.

At the rear end of each side of the frame 1 is an upstanding retainer member 13; and latches 14 for the lower side of the end-gate 4 consist of long bars with upturned rear ends 15, the inner edges of which ends 15 engage the lower edge part of the end-gate 4; the outer edges of these ends 15 being curved or beveled to allow the lower edge of the end-gate 4 to depress the rear ends of the latches 14 as it swings shut on its upper pivotal supports constituted by the pins 5′ in the brackets 7, by which action the front ends of the latches 14 swing up, as the latches are fulcrumed a short distance from their front ends in bracket 16 depending from the bottom of the bed 3. The front ends of the latches 14 are within the retainer members 13. The parts are so proportioned that the front ends of the latches 14 will strike the upper ends of the retainer members 13 just as the bed 3 reaches its hauling position and after the end-gate 4 has swung shut by gravity; and, during the tilting of the bed backward these latches 14 will be held in latching position by this engagement with the upper ends of the members 13 until the last stage of bed tilting, when the lower edges of the latches engage the corners of the frame 1 and the latches have reached such an inclination in the members 13 that they are no longer retained by the upper ends of these members; so that the latches have their rear upturned ends 15 swung down away from the end-gate 4, allowing the end gate to swing open by its own weight and by that of such load as bears against it inside the bed. Short tension coil springs 14' are stretched from the bed 3 to the respective latches 14 slightly to the rear of the fulcrum brackets 16, thus yieldingly holding the latches in latching position until overcome by the engagement with the frame 1 just described.

Adjacent to the downwardly projected forward end of each rocker 10 a guide bracket 17 is fixed to the frame 1, standing up laterally outward from the respective rocker 10 and having a curved slot 18 and an upper rearwardly projected locking lug 19 to receive under it the depending nose 20 which the rocker 10 has some distance back from its front end, when the bed 3 is in hauling position as shown in Fig. 1. The major upper part 21 of the curved slot 18 of the bracket 17 curves rearwardly in its upward extent, conforming to the path of travel of the guide lug 12 of the rocker 10; but a short lower part 22 of this slot curves oppositely, so that as the lug 12 enters this part 22 the nose 20 is permitted to go under the guide-bracket locking lug 19, as the bed tilts forward; or, as the bed starts backward, the travel of the lug 12 in this part 22 permits the nose 20 to pass from under the locking lug 19. It will be understood that the parts are made with the slight clearance required for these actions; such clearance being negligible in proportion to the size and range of operation of the device as a whole. The parts may be cast or forged sufficiently accurate, without machining, thus being adapted to be produced economically. A bar 10' connects the ends of the rockers.

Some distance forward from the rocker 10 and its guide just described, the toggle 23 has upper links 24 pivoted to the bottom of the bed 3, and its lower links 25, straddling respective upper links 24, connected to the upper heads of studs 26 which slide up and down in guide plates 27 fixed to the respective sides of the frame 1. Below these plates 27 compression springs 28 are coiled around the studs 26, confined between the bottoms of the plates 27 and nuts 29 screwed on the lower ends of the studs, to resist upward sliding of the studs. The T-shaped connector 30 has its transverse member 31 pivoted in intermediate parts of the lower links 25 of the toggle 23, and has its stem member 32 extending forward and screwed into a connecting head 33, with a lock nut 34 locking it in adjusted position in this head 33.

The front end of the head 33 is pivoted to the lower end of the manipulating lever 35, fulcrumed on a transverse pin 36 in the upper ends of standards 37 which are fixed to the frame 1 and straddle the lever 35. The upper part of the lever 35, above its fulcrum 36, is much longer than its lower part below the fulcrum, and is bent backward to incline over the front of the bed 3 when the parts are in loading and hauling position with the toggle 23 collapsed and the lower end of the lever 35 swung forward. The detent 38 is made up of side members joined along their rear edges by transverse parts and straddling the upper part of the lever 35 some distance down from its upper or handle end, with a fulcrum pin 38' through its side members and the lever 35, so that this detent may swing its lower end 39 over the front rim of the bed 3 in hauling position. The upper end part 40 of this detent 38 is suitably shaped to form a handle; the side members of the detent, where they continue into this handle part 40, being joined by a transverse part in front of the lever handle, affording ample surface for engagement of the hand of the operator to swing the lower part 39 of the detent forward off the bed 3 while grasping the lever 35 to pull the upper part of the lever forward and thus swing its lower member back, straightening the toggle 23 as later will be described. A flat spring 39' has its lower end fixed to the lower transverse part of the lower member 39 of the detent, and its upper end bearing against the rear edge of the lever 35; thus yieldingly holding the lower part 39 of the detent over the bed until overcome by the pressure of the operator's hand. Above the fulcrum 38', the detent engages the rear edge of the lever 35 with one of its transverse parts 41, preventing the lower part 39 from swinging too far backward.

The front end of the bed 3 has a handle 42 fixed to its middle, within easy reach of the operator in the seat structure 2, when the bed is in its completely backward tilted or dumping position.

Figure 2:
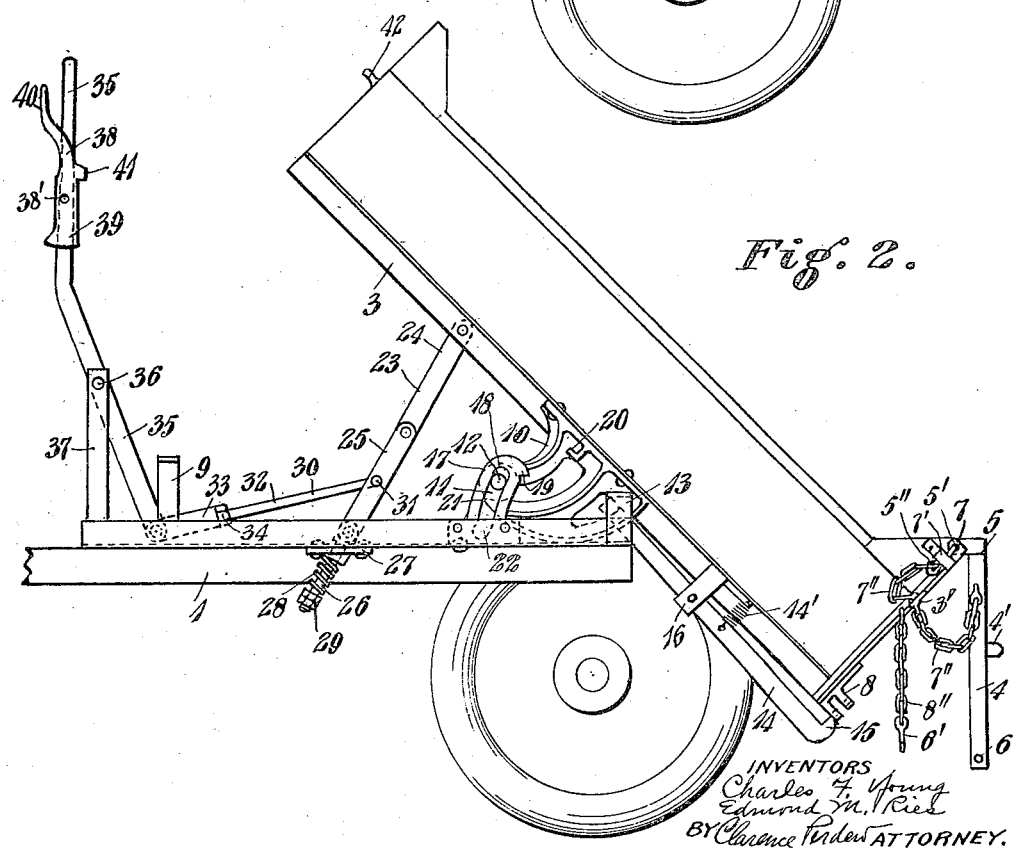
Fig. 2 is a similar view of the same in unloading or dumping position.

The driver, without leaving the seat, merely turns around and reaches over to the lever 35, at once releasing the detent 38 and pulling the lever 35, starting the toggle 23 toward alinement, and tending to raise the front part of the bed 3 and allowing it to roll backward and downward on its rockers 10, disengaging the nose 20 from the lug 19 as before described. The bed 3 and its load gain momentum slowly and gradually, avoiding any danger to the operator, whose hand, grasping the lever 35, has traveled far forward away from the bed by the time the front end of the bed rises past the point initially occupied by the hand. The dumping is completed when the toggle 23 becomes alined, as in Figs. 2 and 4; this toggle then becoming at once a brace against downward forward return of the bed, and a tension member preventing further backward tilting of the bed. In coming thus into tension, the toggle is cushioned by the spring 28, so that undue shock and noise are avoided. At this point, the end-gate 4 is unlatched and swings open, as before described.

Although the alined toggle 23 thus holds the bed firmly against forward return, the operator now may push the lever 35 backward, pulling the toggle 23 out of alinement and starting the bed, now empty, forward and downward toward reloading and hauling position. Complete return of the bed to this position is best accomplished, after this initial actuation by the toggle, by the operator grasping the rim of the bed, or the handle 42 thereon, and pulling forwardly and downwardly thereon with one hand, while the other hand pushes backward on the lever 35. As the bed reaches its position down on the forward pedestals 9 again, the locking nose 20 of the rocker 10 again engages under the locking lug 19 of the guide bracket 17, locking the rear part of the bed to the frame 1; and the detent 38, as soon as released by the operator's hand, swings over the front end of the bed, locking the front of the bed to the frame 1. Just previous to this, the end-gate 4, having swung shut, is latched by the latches 14 in the manner before described.

When objects longer than the bed are hauled, such as lumber, steel bars and the like, the end-gate is swung down on its lower pivots 6 and held by the chains 7" held in their upper parts by catching in the keyhole shaped slots 3'. In dumping, such objects simply strike the ground with their rear ends, and the vehicle is driven forward from under them. The spurs 4' may have the chains 7" engaged around them while the end-gate hangs on its upper pins 5', unlatched and partly opened under the restriction of these chains when the bed is dumped, for scatering the load, as in distributing material over a road, for example. The facility with which the driver may dump the bed 3 by the use of one hand while driving with the other hand, whether the vehicle be motor driven or drawn by an animal, is of especial advantage in unloading such long materials, or scattering loose material, as permitted by the various adjustments to the end-gate just described. Either in such cases, or in ordinary haulage of loose materials that may be dumped from the bed, such as coal, sand, gravel, bricks or the like, it is not necessary for the driver to leave the seat, either to open or close the end-gate, or to tilt or return the bed. As a coal delivery device, our invention has the advantage of simplicity and lightness, as compared with heavy power-dumped trucks, permitting smaller amounts to be delivered economically. In delivering such long materials as mentioned, our invention effects a great saving of time and labor as compared with removing such material one or a few pieces at a time, necessitating leaving the seat, and often requiring a helper for the driver, as such work usually has been performed.

Although we have illustrated and described somewhat specifically one example of our invention, which we prefer, we do not wish to be understood as being limited to such precise showing and description, but, having thus fully described our invention, as is required,

What we claim as new and desire to secure by Letters Patent is:

1. In a device of the character described, a support, a bed having a rocker on said support, said rocker having one end projected away from said bed, a compound-curved guide on said support, engaged by said end, and mutually engaging means on said rocker and said guide, respectively, engaging and disengaging during travel of said end in one of the curved parts of said guide, to lock said bed to or unlock said bed from said support.

2. In a device of the character described, a support, a bed having a rocker on said support said rocker having one end projected away from said bed, and a guide on said support having a curved portion receiving said projected end and conforming substantially to the rocking travel of said projected end, and having an oppositely directed curved portion receiving said end as it approaches said support, said rocker and said guide having mutually engaging means for locking said bed to said support, engaging and disengaging during travel of said projected end of said rocker in said oppositely directed curved portions of said guide.

CHARLES F. YOUNG.
EDMOND M. RIES.